(12) United States Patent
Thompson (10) Patent No.: US 11,737,424 B2
(45) Date of Patent: Aug. 29, 2023

(54) RAIN SHIELD DEVICE FOR PET CRATES

(71) Applicant: John Thompson, Camden, SC (US)

(72) Inventor: John Thompson, Camden, SC (US)

( * ) Notice: Subject to any disclaimer, the term of this patent is extended or adjusted under 35 U.S.C. 154(b) by 127 days.

(21) Appl. No.: 17/405,121

(22) Filed: Aug. 18, 2021

(65) Prior Publication Data
US 2022/0256805 A1  Aug. 18, 2022

Related U.S. Application Data

(60) Provisional application No. 63/150,290, filed on Feb. 17, 2021.

(51) Int. Cl.
*A01K 1/02* (2006.01)

(52) U.S. Cl.
CPC ................... *A01K 1/0245* (2013.01)

(58) Field of Classification Search
CPC ... A01K 1/00; A01K 1/02; A01K 1/03; A01K 1/035; A01K 1/0245; A01K 1/032; A01K 1/033; A01K 1/034; E04H 15/48; E04H 15/08; E04H 15/06; E04H 1/1211; B60P 3/34; E04F 10/00; E04F 10/02; E04B 7/14; E04D 2013/0468; E04D 13/0459
USPC ....... 52/73, 74, 97, 58, 96, 300, 101; 160/45
See application file for complete search history.

(56) References Cited

U.S. PATENT DOCUMENTS

| | | | | |
|---|---|---|---|---|
| 9,284,734 | B1* | 3/2016 | Inzeo | E04D 13/04 |
| 10,081,944 | B1* | 9/2018 | Staton | E04D 1/34 |
| 2012/0174495 | A1* | 7/2012 | Nolan | E04B 1/64 |
| | | | | 52/58 |
| 2013/0031846 | A1* | 2/2013 | Shaw | E04B 1/64 |
| | | | | 52/97 |
| 2014/0259972 | A1* | 9/2014 | Feuer | E04D 7/00 |

* cited by examiner

*Primary Examiner* — Joshua J Michener
*Assistant Examiner* — Henry Hooper Mudd
(74) *Attorney, Agent, or Firm* — Brennan, Manna & Diamond, LLC (57) ABSTRACT

The present invention relates to a rain and sun shield device for pet crates/cages that prevents rainwater from accumulating inside the crates. More specifically, the rain and sun shield device includes multiple lip structures designed to be mounted on the top surface of the crate, such that the lip structures deflect any rainwater pouring over the crate and prevent any rainwater from entering inside the crate. The rain and sun shield device can be retrofitted to existing animal crate/cage designs or incorporated into the manufacturing of new models to provide protection against rainwater and sunlight. The device protects pets from the elements while being kept in a crate or cage placed in outdoor settings or while being transported in the bed of a pickup truck. The device ensures that pets remain safe, shaded, and dry.

6 Claims, 8 Drawing Sheets

FIG. 8

RAIN SHIELD DEVICE FOR PET CRATES

CROSS-REFERENCE TO RELATED APPLICATION

The present application claims priority to, and the benefit of, U.S. Provisional Application No. 63/150,290, which was filed on Feb. 17, 2021 and is incorporated herein by reference in its entirety.

FIELD OF THE INVENTION

The present invention relates generally to the field of apparatuses for pet cages. More specifically, the present invention relates to a rain shield device comprising a flexible lip structure designed to be mounted on each of the top edges of a pet crate or cage, such that the lip structure extends out and over the door, side walls and air vents, in order to prevent rainwater from entering the openings in the crate or cage. The invention prevents the rainwater from being collected inside the crate, and allows the users to keep the pets in an outdoor environment that is safe, shaded and dry. The lip structure of the present invention can be retrofitted to existing animal crate or cage designs, or incorporated (i.e. molded) into the manufacturing of new pet crate models. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, pet crates, also known as pet cages or pet carriers, include enclosures with a door in which a pet may be kept for security, house training, transportation, sleeping, vehicle travel, prevention of destruction behavior, containment and other reasons. People may keep their pets such as dogs, cats, or others inside the pet crate or cage and then leave the pet in the pet crate outside their home. The pet crates ensure the pets remain safe while they are out of vision of the pet owners. However, if the pet crates are outside, during heavy downpours or long exposure to light showers, rainwater can easily enter inside the pet crates through its doors, windows, and other openings. In such situations where pets are crated in an outside environment, they can be often left sitting, standing or laying in several inches of rainwater on the floor of the crate. Due to prolonged exposure to water, the pets can quickly contract a number of infections, experience skin allergies or other health issues. In other situations, where pets are in cages exposed to the elements, pets must contend with exposure to the sun and heat as well.

Additionally, crates and cages left out in the elements routinely have to be tilted to drain the collected rainwater from the tray floor before the animal can be placed back inside. After the water is drained, the floor (i.e. tray) of the crate or cage is still wet which may cause discomfort to the pets kept inside.

Pet crates with covered roofs are available in the market, however, the covered roofs protect the pets from exposure to sunlight but enable rainwater to easily enter inside the crates through the doors and openings on the crate.

Therefore, there exists a long-felt need in the art for an apparatus for pet crates/cages which prevents the rainwater and sunlight from entering inside the crates/cages while the crate/cage is kept in an outdoor environment. There is also a long-felt need in the art for a device which prevents pets from becoming wet inside the pet crate/cage, when the pet crate/cage is kept in an outdoor environment during heavy rainfall or light showers. Additionally, there is a long-felt need in the art for a device which allows the users to keep the crates/cages outside without worrying about the crate/cage floor becoming wet. Moreover, there is a long-felt need in the art for a device for pet crates/cages which prevents rainwater collection inside the crates/cages and eliminates the need to drain the water from the crate/cage enclosure before placing the pet inside. Further, there is a long felt need in the art for a pet crate/cage accessory which can be easily fitted to existing pet crate/cage designs or can be incorporated into the manufacturing of new pet crate/cage models. Furthermore, there is a long-felt need in the art for a device which protects pets from the elements while being transported in the bed of a pickup truck. Finally, there is a long felt need in the art for a pet crate/cage device which ensures the pet is comfortable, safe, shaded and dry inside the crate/cage, while the crate/cage is placed in an outdoor environment.

The subject matter disclosed and claimed herein, in one embodiment thereof, comprises a rain and sun shield device for pet crates and cages. The rain/sun shield device has flexible shield lips that easily mount to the top portion of a pet crate/cage. The shield device further comprises four shield lips to mount to the top portion along each wall of the crate/cage, each shield lip is a one-piece unit having a flat portion and a flexible sloped portion, the flat portion is mounted onto the top surface of the crate/cage and the sloped portion deflects rainwater and snow while preventing same from entering into vent openings on the contiguous wall of the crate/cage, the flat portion is mounted using bolts or any mechanical fasteners and includes a neoprene backing to provide watertight connection between the top portion of the shield lips and the crate/cage. The flexible sloped portion can be secured to the corresponding wall using a fastener on a rear portion of the sloped portion.

In this manner, the novel pet crate/cage rain and sun shield device of the present invention accomplishes all of the forgoing objectives and provides a relatively safe and convenient solution to ensure pets remain safe, shaded and dry while in pet crates/cages that are kept in an outdoor environment. The pet crate/cage rain and sun shield device of the present invention is also pet-friendly, as it ensures the pet is comfortable inside the pet crate/cage while being outside in heavy rains and protects the pets from the elements while being transported in the bed of a pickup truck. Additionally, the pet crate/cage rain and sun shield device deflects rainwater over the crate/cage roof and prevents the rainwater from entering inside the crate/cage. In this manner, the pet crate/cage rain and sun shield device eliminates the need to drain the crate/cage and ensures the crate/cage floor (i.e. floor tray) remains dry.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a rain and sun shield device for pet crates and cages. The rain/sun shield device has flexible shield lips that easily mount to the top portion of a pet crate/cage. The shield device further comprises a plurality of shield lips to mount to the top portion along walls of the crate/cage, each shield lip includes a one-piece unit having a flat portion and a flexible sloped portion, the flat portion is mounted onto the top surface of the crate/cage and the sloped portion deflects rainwater and snow while preventing same from entering into vent openings on the contiguous wall of the crate/cage, the flat portion is mounted using bolts or any mechanical fasteners and can include a neoprene backing to provide watertight connection between the top portion of the shield lips and the crate/cage. The flexible sloped portion can be secured to the corresponding wall using a fastener on a rear portion of the sloped portion.

In a further embodiment of the present invention, a pet crate/cage rain and sun shield device is disclosed. The device includes a plurality of awnings configured and dimensioned to mount to the top surface of the pet crate/cage and along the upper portions of the walls of the crate/cage and is designed to prevent rainwater and snow from entering the openings that are proximate to the top surface of the pet crate/cage. Each awning can include a flat portion mounted to the top surface of the crate/cage and a flexible slopped portion for deflecting rainwater and the snow away from the sides of the crate/cage.

In a further embodiment of the present invention, the rain and sun shield device can be utilized with a variety of pet crate/cage designs. The rain and sun shield device can be made up of aluminum, heavy duty plastic, polymers, or other metals. The device can be bolted or welded to the top surface of the crate/cage. Each shield lip of the device allows the rainwater or snow to run off from the sloped surface away from the sides of the crate/cage and provides protection to a portion of the pet crate/cage and prevents rainwater and sunlight from entering the crate/cage while allowing air to circulate freely from the air vents, sides and walls of the crate/cage.

In a further embodiment of the present invention, a rain, snow, and sun deflector device for a pet crate/cage is disclosed. The rain, snow and sun deflector device includes four flexible deflectors. Each deflector can be mounted to the top surface proximate to the upper portions of the side walls of the crate/cage. The deflectors extend over the entrance, vent openings, and upper portions of the side walls proximate to the top surface of the crate/cage to deflect the rainwater, snow and sun. Each lip can be secured by small nuts and bolts to hold the lip to the top surface and side surfaces of the crate/cage.

The advantage of the present invention is that the invention provides a rain, snow and sun deflector device for pet crates/cages that can be retrofitted to existing animal crate/cage designs or incorporated into the manufacturing of new models. The deflector keeps pets in an outdoor environment safe, shaded, and dry, and eliminates the need to drain collected rain water from the floor of the crate/cage before putting the animal back inside. The invention also protects pets from the elements while being transported in the bed of a pickup truck.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an apparatus for pet crates/cages which prevents the rainwater and sunlight from entering inside the crates/cages while the crate/cage is kept in an outdoor environment. There is also a long-felt need in the art for a device which prevents pets from becoming wet inside the pet crate/cage, when the pet crate/cage is kept in an outdoor environment during heavy rainfall or light showers. Additionally, there is a long-felt need in the art for a device which allows the users to keep the crates/cages outside without worrying about the crate/cage floor becoming wet. Moreover, there is a long-felt need in the art for a device for pet crates/cages which prevents rainwater collection inside the crates/cages and eliminates the need to drain the water from the crate/cage enclosure before placing the pet inside. Further, there is a long felt need in the art for a pet crate/cage accessory which can be easily fitted to existing pet crate/cage designs or can be incorporated into the manufacturing of new pet crate/cage models. Furthermore, there is a long felt need in the art for a device which protects pets from the elements while being transported in the bed of a pickup truck. Finally, there is a long felt need in the art for a pet crate/cage device which ensures the pet is comfortable, safe, shaded and dry inside the crate/cage, while the crate/cage is placed in an outdoor environment.

The subject matter disclosed and claimed herein, in one embodiment thereof, comprises a rain and sun shield device for pet crates and cages. The rain/sun shield device has flexible shield lips that easily mount to the top portion of a pet crate/cage. The shield device further comprises four shield lips to mount to the top portion along each wall of the crate/cage, each shield lip is a one-piece unit having a flat portion and a flexible sloped portion, the flat portion is mounted onto the top surface of the crate/cage and the sloped portion deflects rainwater and snow while preventing same from entering into vent openings on the contiguous wall of the crate/cage, the flat portion is mounted using bolts or any mechanical fasteners and includes a neoprene backing to provide watertight connection between the top portion of the shield lips and the crate/cage. The flexible sloped portion can be secured to the corresponding wall using a fastener on a rear portion of the sloped portion.

Figure 1:
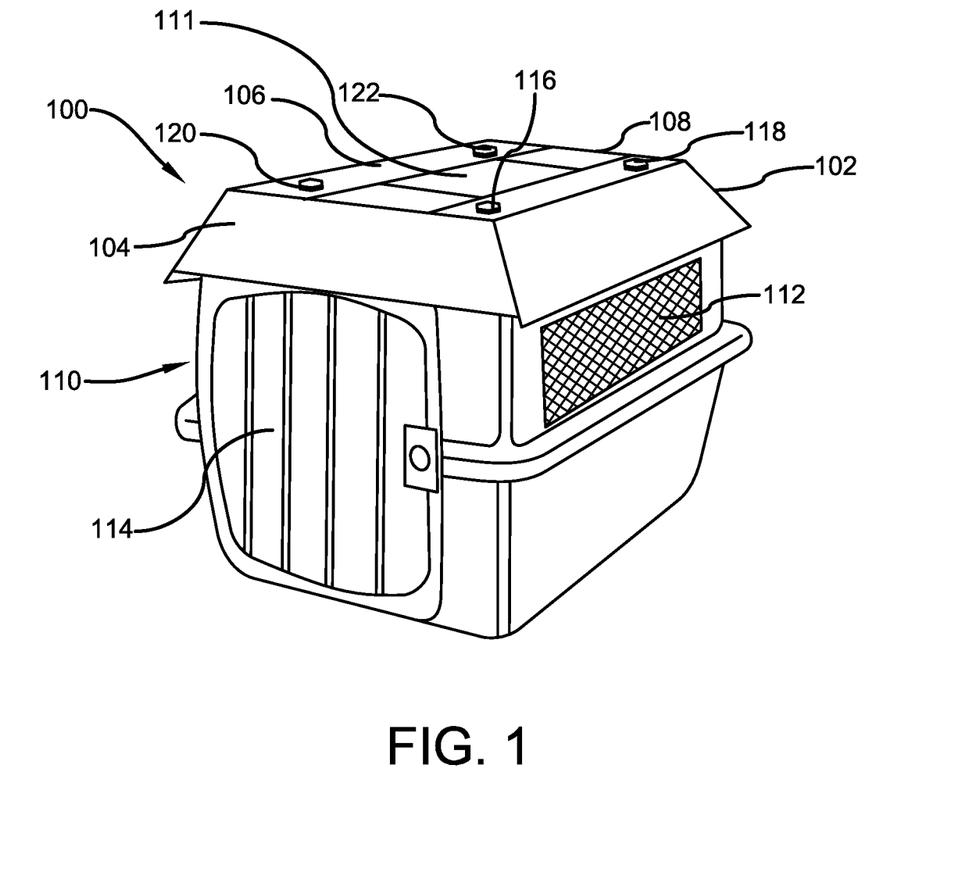
FIG. 1 illustrates a perspective view of one potential embodiment of a pet crate/cage rain and sun shield of the present invention fitted to a conventional pet crate in accordance with the disclosed architecture.

Referring initially to the drawings, FIG. 1 illustrates a perspective view of one potential embodiment of pet crate/cage rain and sun shield of the present invention fitted to a conventional pet crate in accordance with the disclosed architecture. The rain and sun shield device 100 is configured and dimensioned to attach to the top surface 111 of a pet crate (or cage) 110 using bolts and nuts to prevent rainwater from entering the crate 110 from door, side walls, and air vents. The rain and sun shield device 100 protects crated pets from getting wet in an outdoor environment. The pet crate rain and sun shield device 100 includes four rain shield lips 102, 104, 106, 108 dimensioned to retrofit to the top 111 of an existing pet crate (or cage) 110 or onto the top of a newly manufactured pet crate (or cage) 110.

As illustrated, a first rain shield lip 102 configured to cover air vent 112 of one side surface of the pet crate 110 is mounted to the top 111 of the crate 110 using fasteners 116, 118 present at the extreme ends of the first lip 102. Similarly, a second lip 104, configured to protect the entrance 114 of the crate 110, is mounted to the top 111 of the crate 110 using fasteners 116, 120. It should be noted that the first lip 102 and the second lip 104 can have a common fastener 116 to mount the shield lips 102, 104. A third shield lip 106 configured to protect air vents on the other side surface of the crate 110 is mounted to the top 111 of the crate 110 using fasteners 120, 122. A fourth shield lip 108 configured to rear surface of the pet crate 110 is mounted to the top 111 of the crate 110 using fasteners 122, 118. Each shield lip 102, 104, 106, 108 can have one or more common fasteners for mounting or can have separate fasteners. In the preferred embodiment, the fasteners 116, 118, 120, 122 can be small nuts and bolts matching the appearance of the shield lips 102, 104, 106, 108 and crate 100, for securing the rain shield lips 102, 104, 106, 108 to the crate 110.

Each lip 102, 104, 106, 108 extending laterally and sloping downwardly from the top 111 of the crate 110 covers a portion of the pet crate 110 and prevents rainwater from entering the crate 110 while allowing air to circulate freely from the air vents and door of the crate 110. Each shield lip 102, 104, 106, 108 includes a sloped surface 1022, 1042, 1062, 1082, respectively, to cause rainwater and snow to run off the shields 102, 104, 106, 108 and top of the crate 110. The front lip 104 mounted to the crate 110 allows unobstructed pet ingress thereinto and egress therefrom.

It is to be appreciated that the pair of lips or awnings 102, 106 are of similar size and the other pair of lips or awnings 104, 108 are of similar size. Each lip 102, 104, 106, 108 is made up of a flexible material such as polymer plastic that is weatherproof, temper proof and lightweight. Depending on the design of the crate 110 and the positioning of the air vent openings, the dimensions and the slope of the lips 102, 104, 106, 108 can be configured for retrofitting the shield device 100 to a crate (or cage) 110 or incorporating the shield device 100 by design during manufacturing of a crate (or cage) device 110.

The shield lips 102, 104, 106, 108 can be retrofitted to any crate 110 and provide an enclosure, including a pet enclosed therein, with full protection from rain, snow and sun. The shield lips 102, 104, 106, 108 do not crack, fade or peel when exposed to the elements. A layer of UV protection can be added to the lip surfaces.

Figure 2:
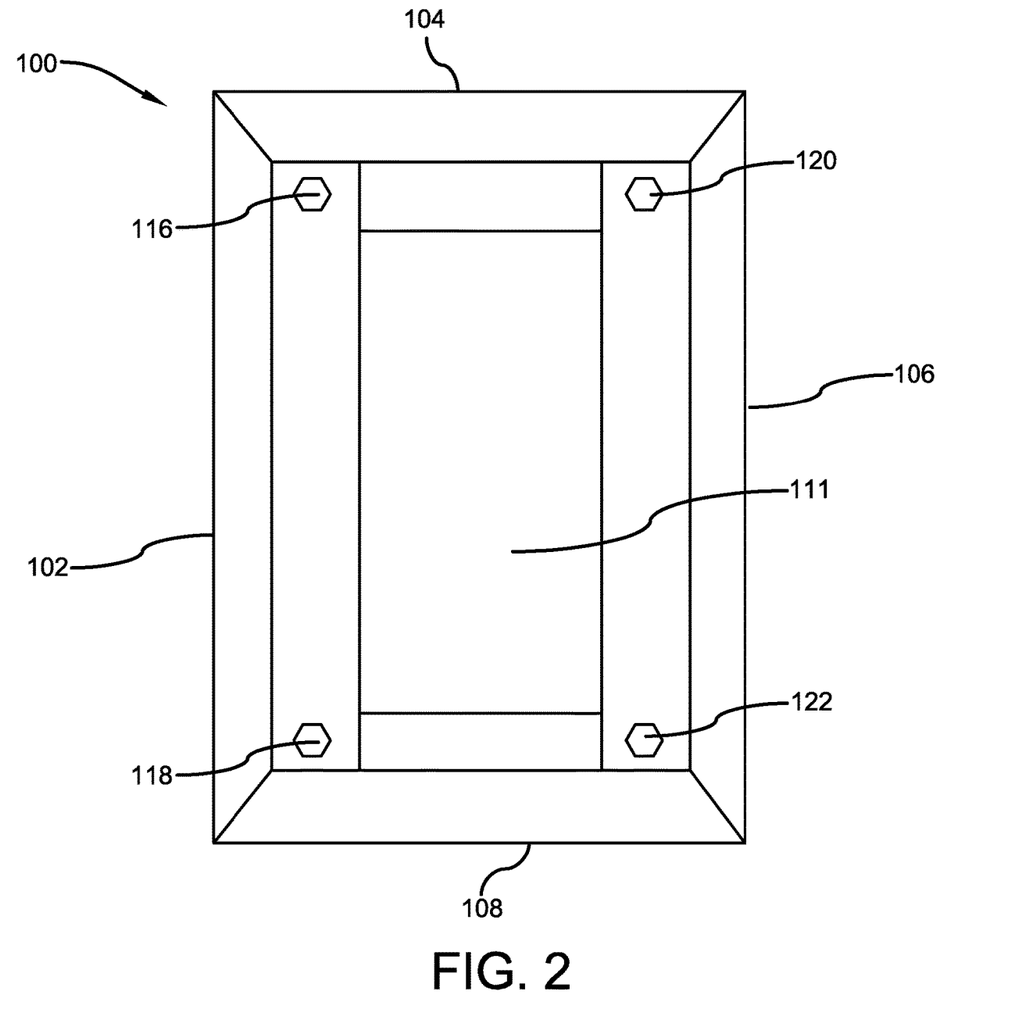
FIG. 2 illustrates a top plan view of one potential embodiment of the pet crate/cage rain and sun shield of the present invention mounted to the top of a pet crate in accordance with the disclosed architecture.

FIG. 2 illustrates a top plan view of one potential embodiment of the pet crate/cage rain and sun shield of the present invention mounted to the top of a pet crate in accordance with the disclosed architecture. The shield lips 102, 104, 106, 108 of the pet crate/cage rain and sun shield 100 are mounted to the top 111 of a pet crate using fasteners 116, 118, 120, 122. The top surface 111 may have slots for mounting the shield lips 102, 104, 106, 108 or alternatively, the fasteners 116, 118, 120, 122 can be drilled into the top surface 111. In another arrangement, the shield lips 102, 104, 106, 108 can include mounting slots for selective sliding engagement of fasteners 116, 118, 120, 122 sliding. The mounting slots provide spacing adjustability to the positioning of shield lips 102, 104, 106, 108 to accommodate different dimensions of crates/cages.

Each shield lip 102, 104, 106, 108 extends laterally and slopes downward from the top portion 111 of the crate/cage. Each shield lip 102, 104, 106, 108 allows the rainwater or snow to run off from the sloped surfaces 1022, 1042, 1062, 1082, and provides protection to an upper portion of the pet crate while preventing rainwater from entering the crate. The rain and sun shield 100 allows air to circulate freely from air vents, side walls and entrances of the crate.

Each shield lip 102, 104, 106, 108 has slots for receiving the fasteners 116, 118, 120 or 122 for mounting the lip to the top portion 111. When mounted, a shield lip can overlap at least another shield lip allowing a single fastener to be used with adjacent shield lips. As illustrated, a single fastener 116 is used for fastening shield lips 102, 104. Similarly, a common fastener 120 is used for fastening 104, 106. Fastener 122 is used for fastening lips 106, 108 and the fastener 118 is used for fastening lips 102, 108. Each fastener 116, 118, 120, 122 can be fastened using a manual or automatic drill machine, or fastened with nuts and bolts. It is to be appreciated that each of the flat mounting top portions 1020, 1040, 1060, 1080 are connected to at least two other of the flat mounting top portions of adjacent individual shield lips. Each of the flat mounting top portions 1020, 1040, 1060, 1080 are orthogonal to at least two other of the flat mounting top portions of adjacent individual shield lips.

The shield device 100 can be used in windy conditions and heavy snow conditions. The shield device 100 allows air circulation while preventing rainwater and snow from entering the openings in a crate/cage, such as, the door and air vents and maintains pets in an outdoor environment safe, shaded, and dry.

The shield device 100 can be mounted to plastic, metal, and/or aluminum crates. The shield device 100 can be bolted or welded as per the preferences of users.

Figure 3:
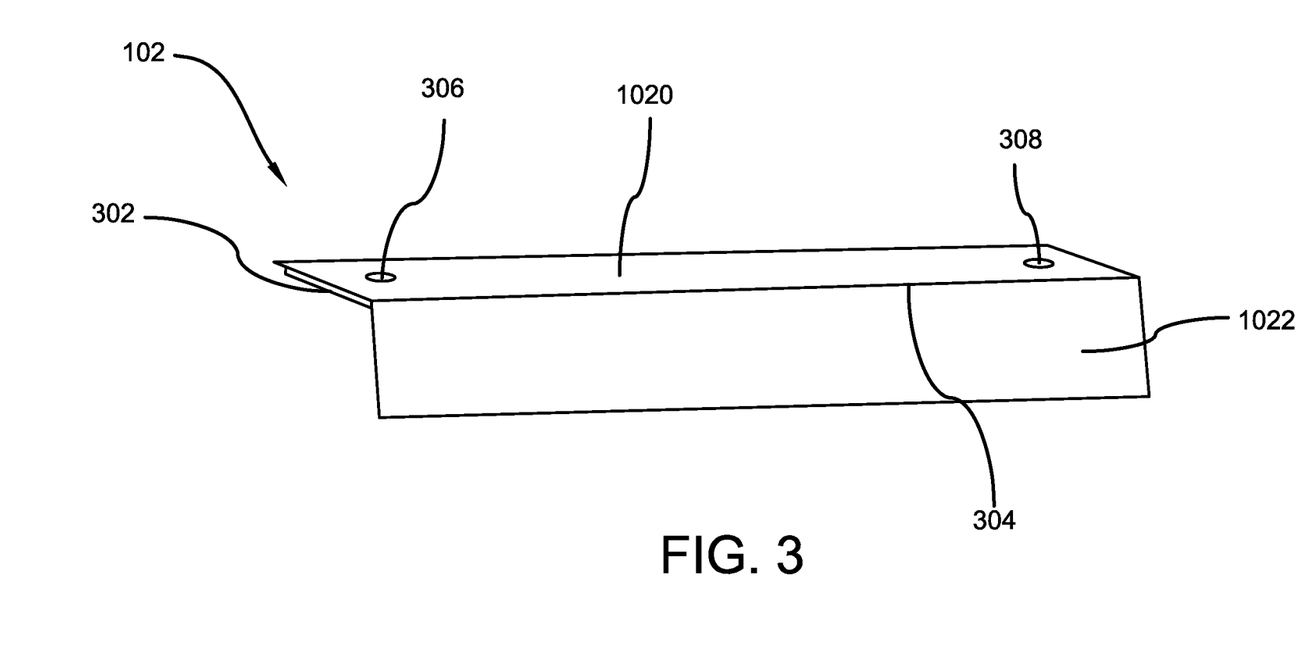
FIG. 3 illustrates a perspective view of a single shield lip of the pet crate/cage shield device of the present invention in accordance with the disclosed architecture.

FIG. 3 illustrates a perspective view of a single shield lip of the pet crate shield device of the present invention in accordance with the disclosed architecture. Features of the shield lip 102 described in the present embodiment are applicable on the other shield lips 104, 106, 108 of the shield device 100. The shield lip 102 has a flat portion 1020 and a sloped surface 1022 with a virtual transition line 304 separating the flat portion 1020 and the slope surface 1022. Similarly, shield lips 104, 106, 108 comprise flat portions 1040, 1060, 1080, and sloped surfaces 1042, 1062, 1082, respectively. The flat surface 1020 is mounted to the top portion of a crate and includes a neoprene or a rubber layer 302 on the bottom surface of the flat portion 1020 for providing water tightness between the flat portion 1020 and crate thereunder. The neoprene or rubber layer 302 prohibits the accumulation of rainwater under the flat portion 1020. The sloped surface 1022 is sloped downwards at an angle of up to sixty degrees allowing an effective run off for rainwater and snow.

The flat portion 1020 includes two holes or slots 306, 308 configured and dimensioned to receive bolts for mounting, selectively placing, and securing the lip 102 to the top surface of the crate. The sloped surface 1022 can also have a fastening mechanism on the rear surface allowing attachment of the sloped surface 1022 with a side surface of the crate. It is to be appreciated that each of the other flat portions 1040, 1060, 1080 can similarly include slots for selective placement and fastening of each the respective shield lips relative to the pet crate.

The shield lips of the shield device 100 are dimensioned to securely fit onto the top surface of pet crates/cages of various dimensions. The shield lips can be made of metal, heavy duty plastic, or aluminum. Each lip is corrosion free, weatherproof, and replaceable.

Figure 4:
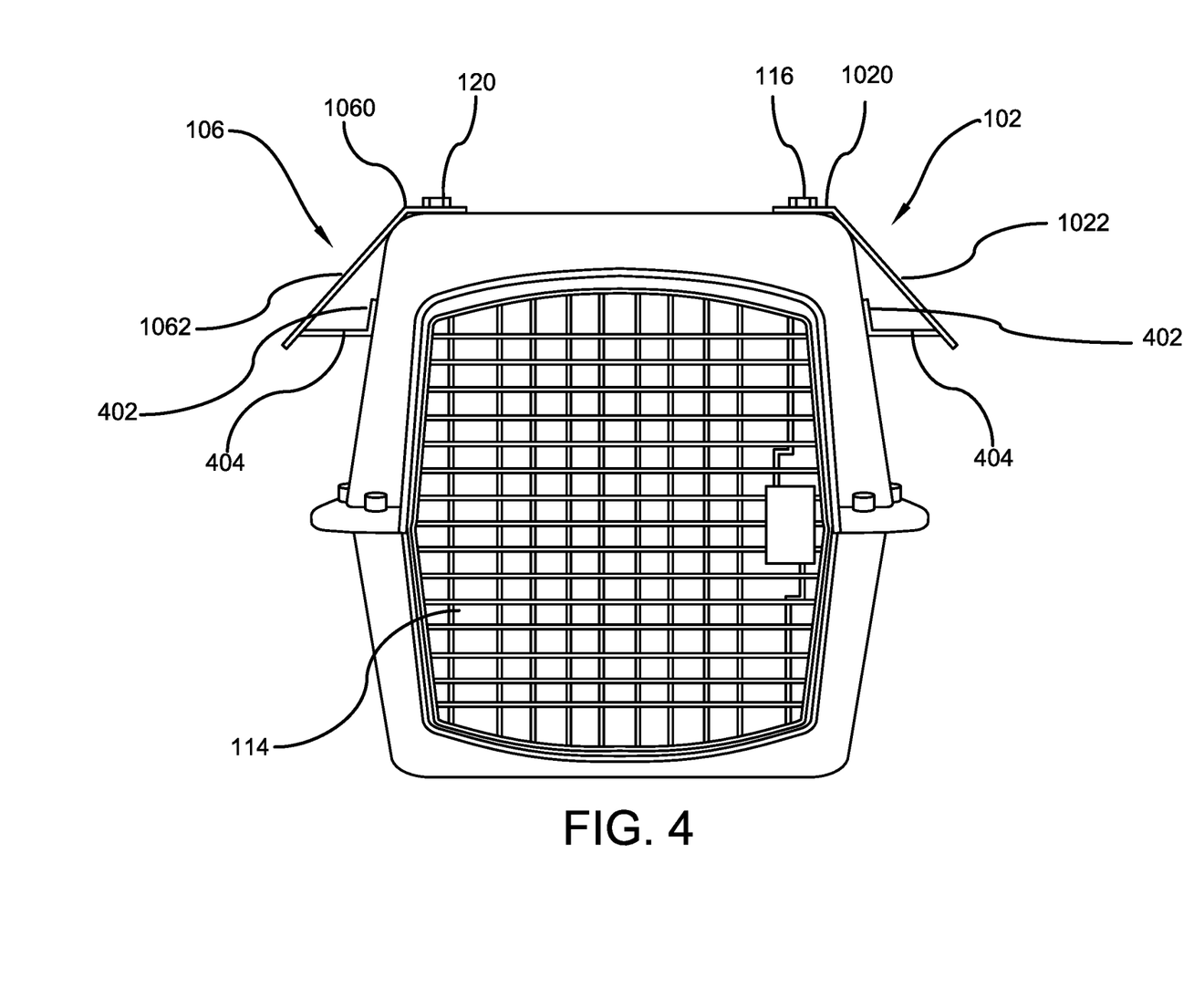
FIG. 4 illustrates a front plan view of a pet crate with the mounted shield device of the present invention in accordance with the disclosed architecture.

FIG. 4 illustrates a front perspective view of a pet crate with the mounted pet crate shield device of the present invention in accordance with the disclosed architecture. As stated earlier, each shield lip of the rain shield device 100 of the present invention can be retrofitted or fitted during manufacturing of a pet crate/cage. In the present embodiment, side shield lips 102, 106 are shown with an additional fastening mechanism attached to the rear portion of the sloped surface of each lip. Each side shield lip 102, 106 are mounted to the top surface 111 of the crate 110 and the sloped surfaces 1022, 1062 are fastened to the respective side surfaces of the crate 110.

A first side shield lip 102 includes flat portion 1020 mounted to the top surface 111 of the crate 110 with a fastener 116. The fastener at the other end of the first side shield lip 102 is not shown in FIG. 4. An additional fastener can be added to a fastening receiver 402 connected to the rear portion of the sloped surface 1022 through a connector 404. A mechanical fastener can be added to the fastening receiver 402 for securing the sloped surface 1022. The fastening receiver 402 can be a grommet spacer or a simple hole to receive a bolt.

A flat portion 1060 of the second side shield lip 106 or a third shield lip 106 is mounted to the top surface 111 with fastener 120. The fastener at the other end of the second side shield lip 106 is not shown in FIG. 4. An additional fastener can be added to the corresponding fastening receiver 402 connected to the rear portion of the sloped surface 1062 through a connector 404. A mechanical fastener can be added to the fastening receiver 402 for securing the sloped surface 1062. The fastening receiver 402 can be a grommet spacer or a simple hole to receive a bolt.

Figure 5:
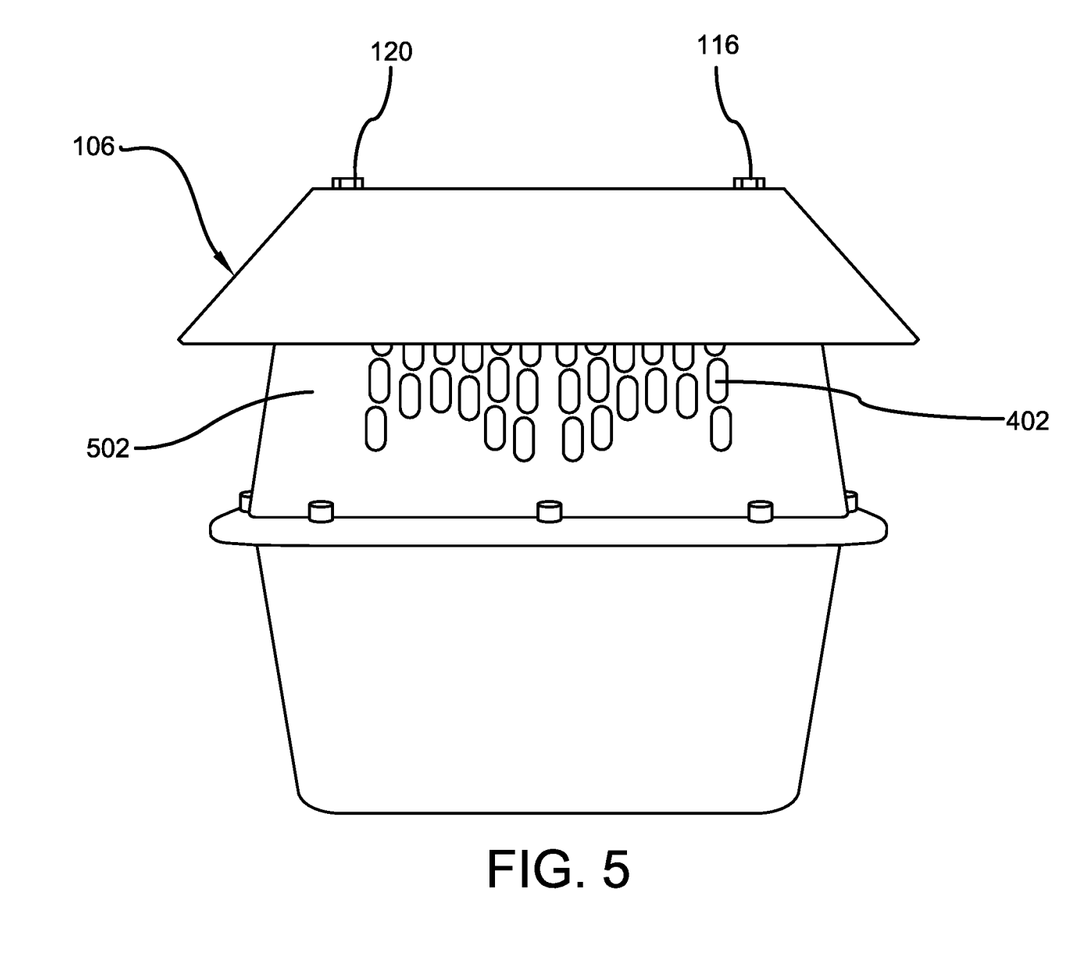
FIG. 5 illustrates a rear plan view of a pet crate with the mounted shield device of the present invention in accordance with the disclosed architecture.

FIG. 5 illustrates a rear perspective view of a pet crate with the mounted pet crate shield device of the present invention in accordance with the disclosed architecture. The rear side shield 108 shields the air vent openings 504 on the rear surface 502 of the crate 110. The rear side shield 108 allows rainwater and snow to run off from the sloped surface 1082 thereby preventing same from entering the vent openings 504.

Figure 6:
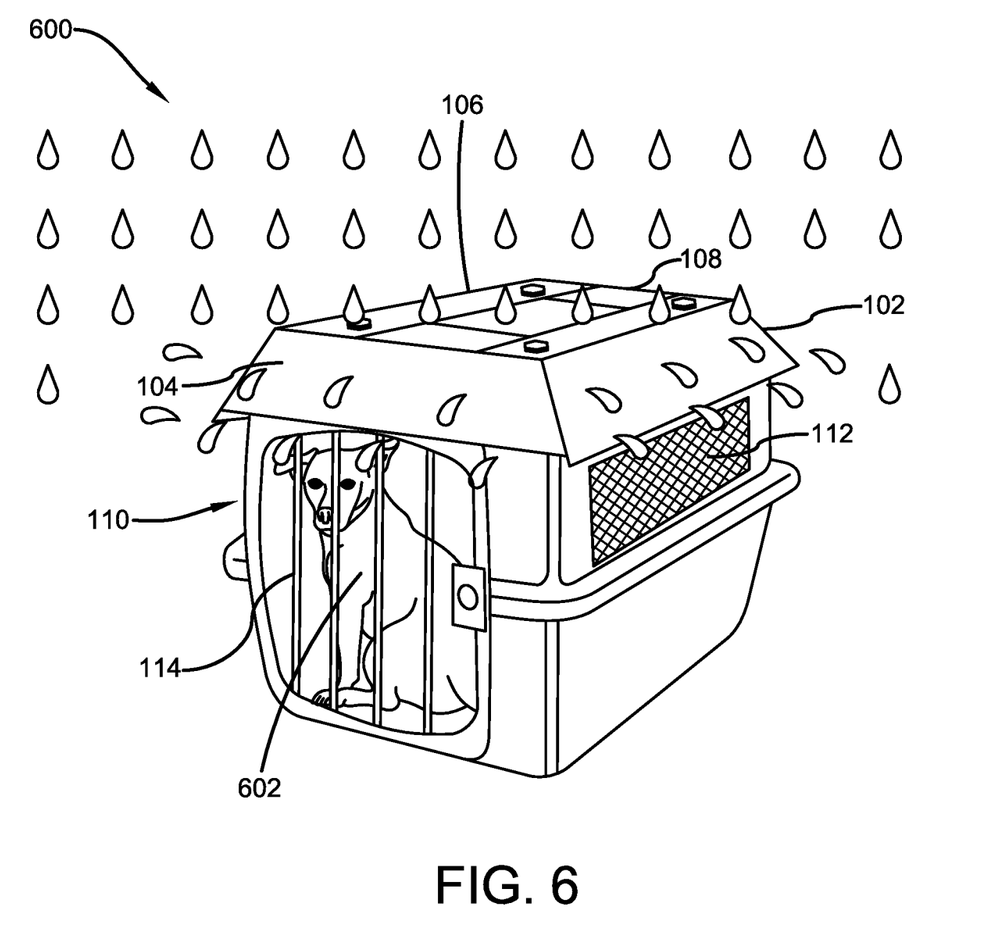
FIG. 6 illustrates a perspective view of the mounted shield device of the present invention deflecting rainwater and preventing same from entering inside a pet crate in accordance with the disclosed architecture.

FIG. 6 illustrates a perspective view of the rainwater shield device of the present invention deflecting rainwater and preventing same from entering inside a pet crate in accordance with the disclosed architecture. The rain shield lips 102, 104, 106, 108 when mounted to the crate 110 deflect the rainwater 600 and prevent the rainwater 600 from accumulating inside the crate 110. A pet 602 such as a dog can securely sit within the crate 110 even when the rain 600 or snow is occurring.

The shield lips 102, 104, 106, 108 act as awnings to deflect rain drops and snow from entering through the crate/cage walls, vent openings, and entrances. Each sloping surface 1022, 1042, 1062, 1082 extends far enough outwardly in a downward slopping manner from its contiguous wall to maintain vent openings formed therein to allow free circulation of air through the ventilation openings.

The shield lips 102, 104, 106, 108 of the present invention effectively protect a pet 602 inside a pet crate 110 from rainwater 600 or snow and protect ventilation openings in the crate 110 proximate to the ceiling from rainwater 600 and snow. The top portion 1020, 1040, 1060, 1080 of each shield lip can include a watertight neoprene or rubber layer thereunder.

The present invention provides a hygienic and dry surface inside the crate 110 to protect the pet 602 from getting wet. For pet owners and trainers, the shield device 100 eliminates the need to drain collected rainwater 600 from the crate 110 before putting the pet 602 back inside the crate 110. The rain shield device 100 can be retrofitted to existing animal crate/cage designs 110 or incorporated into the manufacturing of new models of crates/cages.

Figure 7:
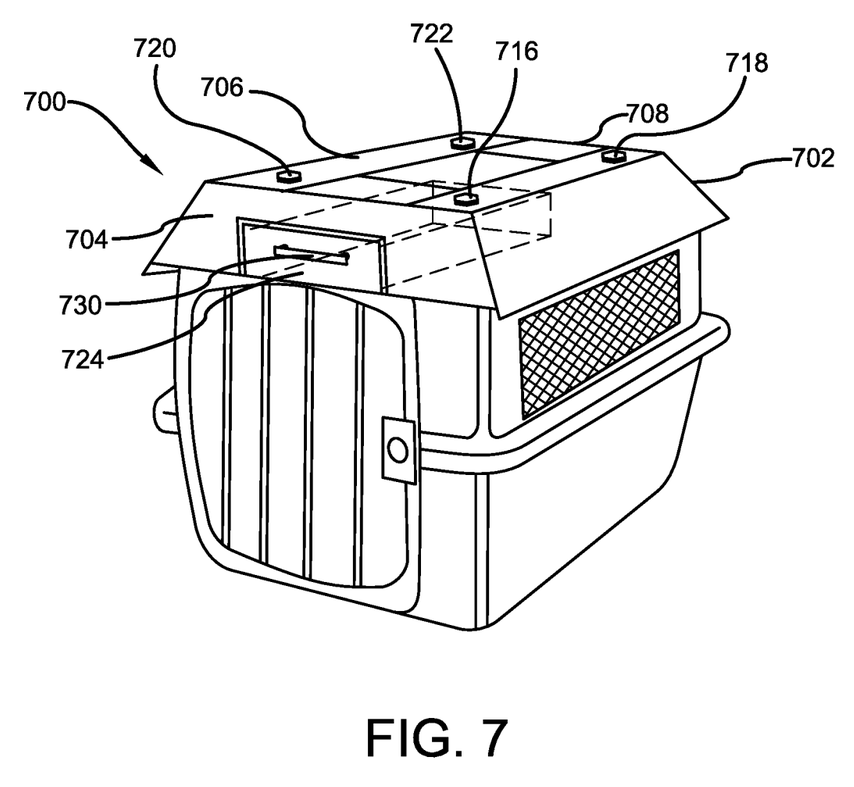
FIG. 7 illustrates a perspective view of another potential embodiment of a pet crate/cage rain and sun shield of the present invention fitted to the top area of a conventional pet crate in accordance with the disclosed architecture.

FIG. 7 illustrates a perspective view of another potential embodiment of a rainwater shield device 700 of the present invention deflecting rainwater and preventing same from entering inside a pet crate in accordance with the disclosed architecture. Rain shield lips 702, 704, 706, 708 when mounted to the crate 110 deflect the rainwater and prevent the rainwater from accumulating inside the crate 110. A pet, such as a dog, can securely sit within the crate 110 even when the rain or snow is occurring.

The shield lips 702, 704, 706, 708 can further include a drawer 724 thereunder. The shield lip 704 acts as an awning to deflect rain drops and snow from entering the drawer 724. The drawer 724 can further include a handle 730 for grasping in order to selectively actuate the drawer. It is to be appreciated that fasteners 716, 718, 720, 722 can include extenders (not illustrated) to elevate lips 702, 704, 706, 708 and to provide the necessary space for drawer 120.

Figure 8:
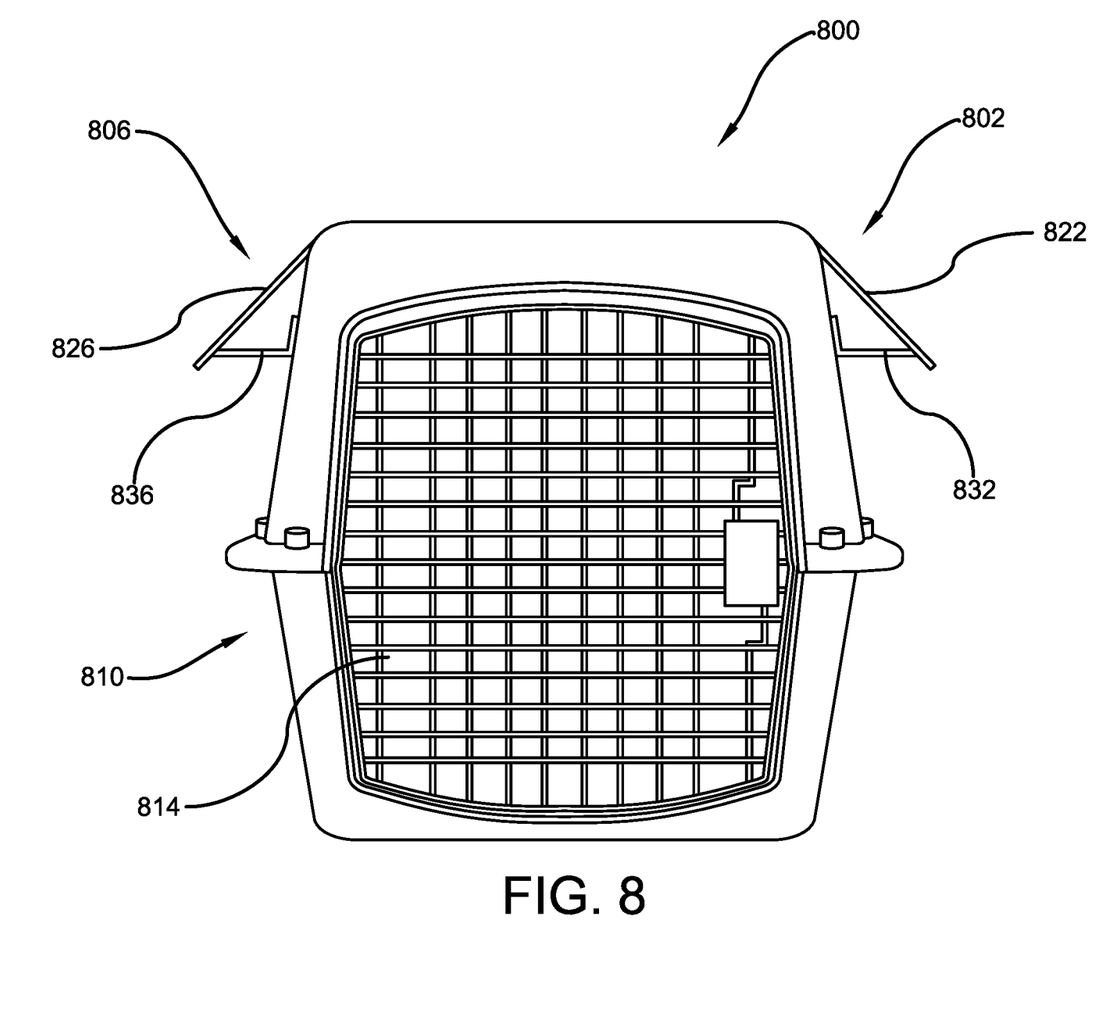
FIG. 8 illustrates a perspective view of yet another potential embodiment of a pet crate/cage rain and sun shield of the present invention molded to the top area of a pet crate in accordance with the disclosed architecture.

FIG. 8 illustrates a perspective view of yet another potential embodiment of a rainwater shield device 800 of the present invention deflecting rainwater and preventing same from entering inside a pet crate in accordance with the disclosed architecture. In one exemplary arrangement, at least a pair of rain shield lips 802, 806, when molded into the top area of the crate 810, deflect the rainwater and prevent the rainwater from accumulating inside the crate 810. It is to be appreciated that another pair of shield lips (not illustrated) can be molded into the top front and top rear areas of the crate 810. A pet, such as a dog, can securely sit within the crate 810 even when the rain or snow is occurring.

The shield lips 802, 806 can each include a molded sloped portion 822, 826 and a molded support portion 832, 836, respectively. The molded shield lips 802, 806 function as awnings to deflect rain drops and snow from entering the crate 810. The shield lips 802, 806 extend away from entrance 814 to enable access thereto.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "pet crate rain shield device", "pet crate rain shield", "rain shield device", "shield device", "rain and snow deflector device" and "crate shield", are interchangeable and refer to the pet crate rain shield 100, 700, 800 of the present invention.

Notwithstanding the foregoing, the pet crate rain shield 100, 700, 800 of the present invention can be of any suitable size and configuration as is known in the art without affecting the overall concept of the invention, provided that it accomplishes the above-stated objectives. One of ordinary skill in the art will appreciate that the size, configuration, and material of the pet crate rain shield 100, 700, 800 as shown in the FIGS. are for illustrative purposes only, and that many other sizes and shapes of the pet crate rain shield 100, 700, 800 are well within the scope of the present disclosure. Although the dimensions of the pet crate rain shield 100, 700, 800 are important design parameters for user convenience, the pet crate rain shield 100, 700, 800 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pet crate shield device configured to provide protection to a pet crate positioned therebelow, the pet crate shield device comprising:
   a pet crate shield including a plurality of individual shield lips;
   each said plurality of shield lips comprises a flat mounting top portion and a sloping portion extending from said flat mounting top portion;
   wherein said plurality of individual shield lips comprise four shield lips;
   each said flat mounting top portion connected to at least two other said flat mounting top portions of adjacent individual shield lips;
   a plurality of fasteners for attaching said plurality of shield lips to the pet crate,
   wherein each fastener secures a portion of at least two said shield lips; and
   a drawer mounted under said plurality of individual shield lips, wherein said drawer selectively actuated from under at least one shield lip.

2. The pet crate shield device of claim 1, wherein said plurality of fasteners comprise four fasteners.

3. The pet crate shield device of claim 2, wherein said individual shield lips include slots for selective placement and fastening of each said shield lip relative to the pet crate.

4. The pet crate shield device of claim 3, wherein said plurality of individual shield lips are plastic.

5. The pet crate shield device of claim 4, wherein said fasteners are nuts and bolts.

6. The pet crate shield device of claim 4, wherein each said flat mounting top portion of each said shield lip includes a neoprene layer on a lower side of each said flat mounting top portion for watertightness between said plurality of shield lips and the pet crate thereunder.

\* \* \* \* \*